No. 879,532.  PATENTED FEB. 18, 1908.
L. DE FOREST.
SPACE TELEGRAPHY.
APPLICATION FILED JAN. 29, 1907.

WITNESSES
E. B. Tomlinson
Patrick J. Conroy

INVENTOR
Lee de Forest
by Geo. K. Woodworth,
Atty.

UNITED STATES PATENT OFFICE.

LEE DE FOREST, OF NEW YORK, N. Y., ASSIGNOR, BY MESNE ASSIGNMENTS, TO DE FOREST RADIO TELEPHONE CO., A CORPORATION OF NEW YORK.

SPACE TELEGRAPHY.

No. 879,532.

Specification of Letters Patent.

Patented Feb. 18, 1908.

Application filed January 29, 1907. Serial No. 354,662.

*To all whom it may concern:*

Be it known that I, LEE DE FOREST, a citizen of the United States, and a resident of New York, in the county of New York and State of New York, have invented a new and useful Improvement in Space Telegraphy, of which the following is a specification.

My invention relates to wireless telegraph receivers or oscillation detectors of a type heretofore described in my prior Letters Patent Nos. 824,637, June 26, 1906 and 836,070, November 13, 1906.

The objects of my invention are to increase the sensitiveness of oscillation detectors comprising in their construction a gaseous medium by means of the structural features and circuit arrangements which are hereinafter more fully described.

My invention will be described with reference to the drawings which accompany and form a part of the present specification, although it is to be understood that many modifications may be made in the apparatus and systems herein described without departing from the principles of my invention.

Figure 1:
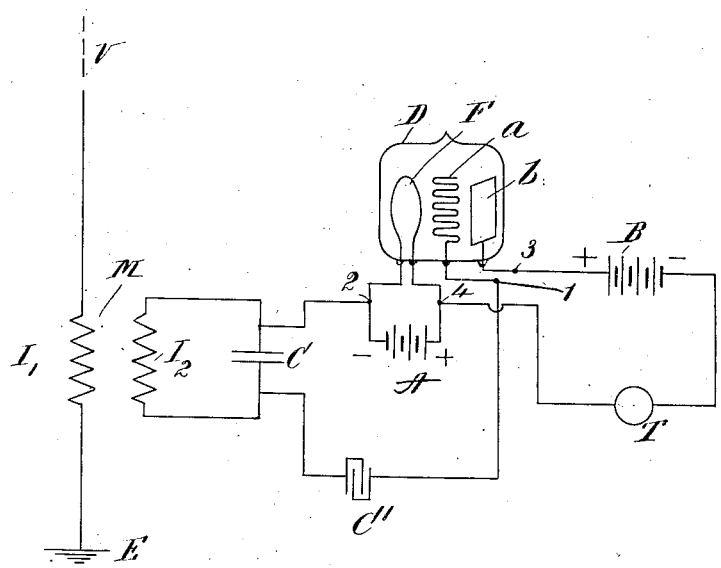
Figure 2:
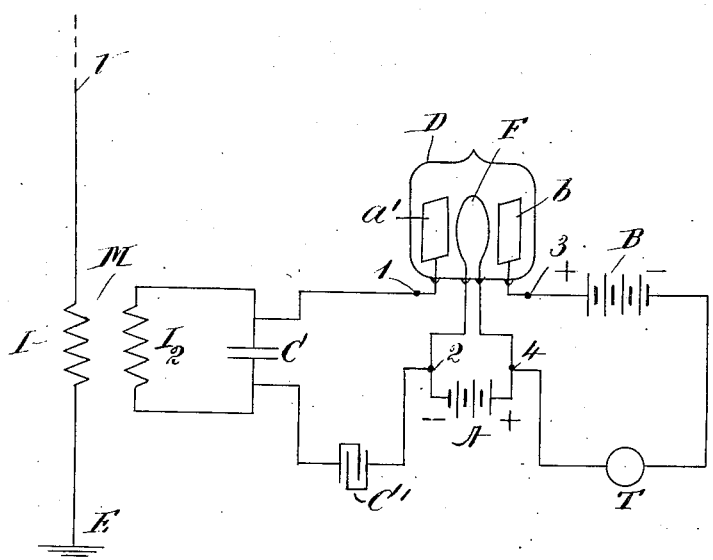

In the drawings, Figure 1 represents in diagram a wireless telegraph receiving system comprising an oscillation detector constructed and connected in accordance with the present invention and Fig. 2 represents a space telegraph receiving system having a modified form of oscillation detector connected therein in a manner which constitutes one of the subjects matter of said invention.

V $I_1$ E is an elevated conductor system including the elevated conductor V, earth connection E, and primary $I_1$ of the transformer M, the secondary $I_2$ of which forms part of the tuned receiving circuit $I_2$ C. It will be understood of course that the aforesaid tuned receiving circuit may be associated with the elevated conductor system in any suitable manner.

D represents an evacuated vessel, preferably of glass, having sealed therein three conducting members, F, $a$ and $b$, in Fig. 1 and F, $a'$ and $b$ in Fig. 2. The conducting member or electrode F is shown as consisting of a filament, preferably of metal, which is connected in series with the battery A or other source of electrical current of sufficient strength to heat said filament, preferably to incandescence. The conducting member $b$, which may be a plate of platinum, has one end brought out to the terminal 3. Interposed between the members F and $b$ is a grid-shaped member $a$, which may be formed of platinum wire, and which has one end brought out to the terminal 1. The local receiving circuit, which includes the battery B, or other suitable source of electromotive force, and the signal indicating device T, which may be a telephone receiver, has its terminals connected to the plate $b$ and filament F at the points 3 and 4 respectively. The means for conveying the oscillations to be detected to the oscillation-detector, are the conductors which connect the filament F and grid $a$ to the tuned receiving circuit and, as shown, said conductors pass from the terminals 2 and 1 to the armatures of the condenser C.

I have determined experimentally that the presence of the conducting member $a$, which as before stated may be grid-shaped, increases the sensitiveness of the oscillation detector and, inasmuch as the explanation of this phenomenon is exceedingly complex and at best would be merely tentative, I do not deem it necessary herein to enter into a detailed statement of what I believe to be the probable explanation.

In associating an oscillation detector of the above mentioned type, said detector being now commonly known as the audion, with a closed tuned circuit, it will be noted by reference to Fig. 2, that the secondary $I_2$ closes a circuit containing a battery shown at B through the electrode $b$, conducting member $a'$ and the conducting gaseous medium intervening between said electrode and member. Also by reference to Fig. 1, it will be seen that a similar closed circuit exists between said battery, and the electrode $b$ and conducting member $a$. In order to close each of said circuits to the passage of direct current from the aforesaid battery therethrough, or to prevent the development of a difference of potential between the members $a$ and $b$, or between $a'$ and $b$, or to prevent the members $a$ or $a'$ from receiving an electrical charge from said battery, I insert the condenser C' in said otherwise mechanically closed circuit and find that the presence of said condenser produces a great increase in the sensitiveness of the oscillation detector as determined by the very marked increase in the sound produced in the telephone T when said condenser is present over the sounds produced therein under the same conditions when said condenser is not employed.

It will be understood that the circuit arrangements herein described with reference to the particular forms of audion herein disclosed may with advantage also be employed with various other types of audion.

I claim:

1. An oscillation detector comprising an evacuated vessel, an electrode inclosed therein, means for heating said electrode, a second electrode inclosed within said vessel, a local circuit having its terminals electrically connected to said electrodes, a conducting member inclosed within said vessel and located between said electrodes, and means for conveying the oscillations to be detected to the first mentioned electrode and said conducting member.

2. An oscillation detector comprising an evacuated vessel, two electrodes inclosed within said vessel, means for heating one of said electrodes, and a conducting member inclosed within said vessel and interposed between said electrodes.

3. An oscillation detector comprising an evacuated vessel, two electrodes inclosed within said vessel, means for heating one of said electrodes, and a grid-shaped member of conducting material inclosed within said vessel and interposed between said electrodes.

4. An oscillation detector comprising an evacuated vessel, a filament sealed therein, a source of electrical energy connected in series with said filament, an electrode sealed in said vessel, a local circuit having its terminals connected to said filament and electrode, respectively, said local circuit including a source of electromotive force and a signal indicating device, a grid of conducting material sealed in said vessel and interposed between said filament and electrode, and means for conveying the oscillations to be detected to said filament and grid.

5. An oscillation detector comprising an evacuated vessel, an electrode inclosed therein, means for heating said electrode, a second electrode inclosed within said vessel, a local circuit having its terminals connected to said electrodes, a conducting member inclosed within said vessel and located between said electrodes, a closed circuit for conveying the oscillations to be detected to said first mentioned electrode and conducting member, and a condenser in said closed circuit.

6. An oscillation detector comprising an evacuated vessel, two electrodes inclosed therein, means for heating one of said electrodes, a conducting member inclosed within said vessel and interposed between said electrodes, means for establishing a difference of electrical potential between said electrodes and means for preventing said conducting member from becoming electrically charged.

7. An oscillation detector comprising an evacuated vessel inclosing a sensitive conducting gaseous medium, three conducting members inclosed therein, a closed oscillation circuit, a circuit connecting an element of said oscillation circuit with two of said members, a condenser in said circuit, a signal-indicating device, and a circuit connecting said device with one of said two members and with the third member.

8. An oscillation detector comprising an evacuated vessel, two electrodes inclosed therein, means for heating one of said electrodes, a conducting member inclosed within said vessel and interposed between said electrodes, means for establishing a difference of electrical potential between said electrodes and means for preventing the establishment of a difference of electrical potential between one of said electrodes and said conducting member.

9. An oscillation detector comprising an evacuated vessel, two electrodes inclosed therein, means for heating one of said electrodes, a grid of conducting material inclosed within said vessel and interposed between said electrodes, means for establishing a difference of electrical potential between said electrodes and means for preventing said grid from becoming electrically charged.

10. An oscillation detector comprising an evacuated vessel, two electrodes inclosed therein, means for heating one of said electrodes, a grid of conducting material inclosed within said vessel and interposed between said electrodes, means for establishing a difference of electrical potential between said electrodes and means for preventing the establishment of a difference of electrical potential between one of said electrodes and said grid.

11. An oscillation detector comprising an evacuated vessel, an electrode inclosed therein, means for heating said electrode, a second electrode inclosed within said vessel, a local circuit having its terminals electrically connected to said electrodes, a grid of conducting material inclosed within said vessel and located between said electrodes, and means for conveying the oscillations to be detected to the heated electrode and grid.

12. An oscillation detector comprising an evacuated vessel, an electrode inclosed therein, means for heating said electrode, a second electrode inclosed within said vessel, a local circuit having its terminals connected to said electrodes, a grid of conducting material inclosed within said vessel and located between said electrodes, a closed circuit for conveying the oscillations to be detected to the heated electrode and grid, and a condenser in said closed circuit.

13. An oscillation detector comprising an evacuated vessel, an electrode inclosed therein, means for heating said electrode, a second electrode inclosed within said vessel, a local circuit having its terminals electrically connected to said electrodes, said local circuit including a source of electromotive force and a signal indicating device, a grid of conducting material inclosed within said vessel and located between said electrodes, and means for conveying the oscillations to be detected to the heated electrode and grid.

14. An oscillation detector comprising an evacuated vessel, two electrodes, one of which is a filament, inclosed within said vessel, means for heating said filament, and a conducting member inclosed within said vessel and interposed between said electrodes.

15. An oscillation detector comprising an evacuated vessel, two electrodes inclosed within said vessel, means for heating one of said electrodes, a grid of conducting material inclosed within said vessel and interposed between said electrodes, a local circuit connecting said electrodes, and a source of electromotive force and signal indicating device in said local circuit.

16. An oscillation detector comprising an evacuated vessel, two electrodes, one of which is a filament, inclosed within said vessel, means for heating said filament, and a grid of conducting material inclosed within said vessel and interposed between said electrodes.

17. An oscillation detector comprising an evacuated vessel, two electrodes inclosed within said vessel, means for heating one of said electrodes, a conducting member inclosed within said vessel and interposed between said electrodes, and a local circuit including a source of electromotive force connecting said electrodes.

18. An oscillation detector comprising an evacuated vessel, two electrodes inclosed within said vessel, means for heating one of said electrodes, a grid of conducting material inclosed within said vessel and interposed between said electrodes, a local circuit including a source of electromotive force connecting said electrodes and a signal indicating device associated with said local circuit.

19. An oscillation detector comprising an evacuated vessel, two electrodes, one of which is a filament, inclosed within said vessel, means for heating said filament, a grid of conducting material inclosed within said vessel and interposed between said electrodes and a local circuit including a source of electromotive force connecting said electrodes.

20. An oscillation detector comprising an evacuated vessel, two electrodes inclosed therein, means for heating one of said electrodes, a conducting member inclosed within said vessel, a closed oscillation circuit, a circuit connecting one element of said oscillation circuit with one of said electrodes and said conducting member, and a condenser in said circuit.

21. An oscillation detector comprising an evacuated vessel, two electrodes inclosed therein, means for heating one of said electrodes, a conducting member inclosed within said vessel, a closed oscillation circuit, a circuit connecting one element of said oscillation circuit with one of said electrodes and said conducting member, a condenser in said circuit, a signal indicating device and a circuit connecting said device with the other of said electrodes and said conducting member.

In testimony whereof, I have hereunto subscribed my name this 21st day of Dec. 1906.

LEE DE FOREST.

Witnesses:
THOMAS I. GALLAGHER,
HANS W. GOETZE.